United States Patent
Zimmerman et al.

(10) Patent No.: US 10,087,543 B2
(45) Date of Patent: Oct. 2, 2018

(54) SEAL RINGS IN ELECTROCHEMICAL PROCESSORS

(71) Applicant: APPLIED Materials, Inc., Santa Clara, CA (US)

(72) Inventors: Nolan L. Zimmerman, Kalispell, MT (US); George Mattinger, Cupertino, CA (US); Gregory J. Wilson, Kalispell, MT (US); Eric A. Englhardt, Palo Alto, CA (US); Balamurugan Ramasamy, Bangalore (IN)

(73) Assignee: Applied Materials, Inc., Santa Clara, CA (US)

( * ) Notice: Subject to any disclaimer, the term of this patent is extended or adjusted under 35 U.S.C. 154(b) by 0 days.

(21) Appl. No.: 15/423,298

(22) Filed: Feb. 2, 2017

(65) Prior Publication Data
US 2017/0145582 A1    May 25, 2017

Related U.S. Application Data

(63) Continuation of application No. 13/474,533, filed on May 17, 2012, now abandoned.

(51) Int. Cl.
| | |
|---|---|
| *F16J 9/00* | (2006.01) |
| *C25D 17/00* | (2006.01) |
| *F16J 15/3236* | (2016.01) |
| *F16J 15/3204* | (2016.01) |
| *F16J 15/16* | (2006.01) |

(Continued)

(52) U.S. Cl.
CPC ......... *C25D 17/004* (2013.01); *C25D 17/001* (2013.01); *F16J 15/00* (2013.01); *F16J 15/025* (2013.01); *F16J 15/16* (2013.01); *F16J 15/3204* (2013.01); *F16J 15/3236* (2013.01); *C25D 17/002* (2013.01)

(58) Field of Classification Search
CPC .. F16J 15/16; F16J 15/00; F16J 15/025; F16J 15/3204; F16J 15/3236; C25D 17/004; C25D 17/001; C25D 17/002; C25D 5/028; C25D 7/123
USPC .......................................... 277/345; 205/136
See application file for complete search history.

(56) References Cited

U.S. PATENT DOCUMENTS

| | | | |
|---|---|---|---|
| 5,409,337 A | * | 4/1995 | Muyskens .............. F16J 15/062 285/379 |
| 6,869,510 B2 | | 3/2005 | Woodruff et al. |

(Continued)

OTHER PUBLICATIONS

Chinese State Intellectual Property Office, "First Office Action" issued in CN Patent Application No. 201310183105.0 (dated Nov. 4, 2016).

*Primary Examiner* — Nathan Cumar
(74) *Attorney, Agent, or Firm* — Perkins Coie LLP; Kenneth H. Ohriner (57) ABSTRACT

A seal ring for an electrochemical processor does not slip or deflect laterally when pressed against a wafer surface. The seal ring may be on a rotor of the processor, with the seal ring having an outer wall joined to a tip arc through an end. The outer wall may be a straight wall. A relatively rigid support ring may be attached to the seal ring, to provide a more precise sealing dimension. Knife edge seal rings that slip or deflect laterally on the wafer surface may also be used. In these designs, the slipping is substantially uniform and consistent, resulting in improved performance.

11 Claims, 7 Drawing Sheets

(51) Int. Cl.
*F16J 15/00* (2006.01)
*F16J 15/02* (2006.01)

(56) References Cited

U.S. PATENT DOCUMENTS

| | | |
|---|---|---|
| 7,087,144 B2 | 8/2006 | Herchen |
| 7,854,434 B2 * | 12/2010 | Heiman ................ F16J 15/121 277/628 |
| 7,935,231 B2 * | 5/2011 | Ghongadi .............. C25D 21/08 204/199 |
| 8,172,992 B2 | 5/2012 | Prabhakar et al. |
| 8,377,268 B2 * | 2/2013 | Rash ...................... C25D 17/02 204/297.01 |
| 8,398,831 B2 * | 3/2013 | Ghongadi .............. C25D 21/08 204/279 |
| 2001/0037945 A1 | 11/2001 | Okase et al. |

* cited by examiner

SEAL RINGS IN ELECTROCHEMICAL PROCESSORS

PRIORITY CLAIM

This application is a Continuation of U.S. patent application Ser. No. 13/474,533, filed May 17, 2012, and now pending.

BACKGROUND OF THE INVENTION

Production of semiconductor integrated circuits and other micro-scale devices typically requires formation of multiple metal layers on a wafer or other substrate. By electroplating metals layers in combination with other steps, such as planarizing, etching and photolithography, patterned metal layers forming the micro-scale devices are created.

Electroplating is performed with the substrate, or one side of the substrate, in a bath of liquid electrolyte, and with electrical contacts touching a conductive layer on the substrate surface. Electrical current is passed through the electrolyte and the conductive layer. Metal ions in the electrolyte deposit or plate out onto the substrate, creating a metal layer on the substrate. The metal ions also tend to plate out onto the electrical contacts as well. This affect, referred to as "plate-up" changes the electric field around the contacts, causing non-uniform plating. The metal plated onto the electrical contacts consequently must be removed, adding to the time requirements and complexity of the manufacturing process.

So called dry or closed contact rings have been developed to avoid plate-up of the contacts. In these designs, a seal ring seals the electrolyte away from the electrical contacts. The electrical contacts touch the conductive layer on the substrate at the perimeter of the substrate. The seal ring contacts the substrate surface radially inwardly of the electrical contacts, so that the contacts remain isolated from the electrolyte.

Although the use of a seal in a dry contact ring solves the plate-up problem, dry contact rings have their own disadvantages. Initially, the seal of a dry contact ring necessarily contacts or covers an annular shaped area on the substrate surface, which area cannot be used to form devices. Hence, a fraction of the useable substrate surface must be sacrificed if a seal is used. The seal must also not unduly disturb the electric field around the edge of the wafer, or electroplating quality will be degraded. In some processors, the seal can also plate up (i.e., metal gets plated onto the seal) over successive wafer plating cycles. Avoiding seal plate up is also significant in providing uniform high quality metal plated wafers. The seal must also perform reliably and consistently over a large number of plating cycles, without leaking and with minimal sticking to the wafer after the plating cycle.

SUMMARY OF THE INVENTION

A new seal ring for an electrochemical processor has now been invented. In one design, the new seal ring does not slip when sealed against a wafer surface. The seal ring may be on a rotor of the processor, with the seal ring having an outer wall joined to a tip arc. The outer wall may be a straight wall. A relatively rigid support ring may be attached to the seal ring, to provide a more precise sealing dimension. The seal may optionally be molded onto the e.g., metal support ring. Knife edge seal rings that slip or deflect laterally on the wafer surface may also be used. In these designs, the slipping is substantially uniform and consistent, resulting in improved performance. The present seal rings also have minimal area of contact with the wafer, which improves yield.

BRIEF DESCRIPTION OF THE DRAWINGS

In the drawings, the same reference number indicates the same element in each of the views.

DETAILED DESCRIPTION

Figure 1:
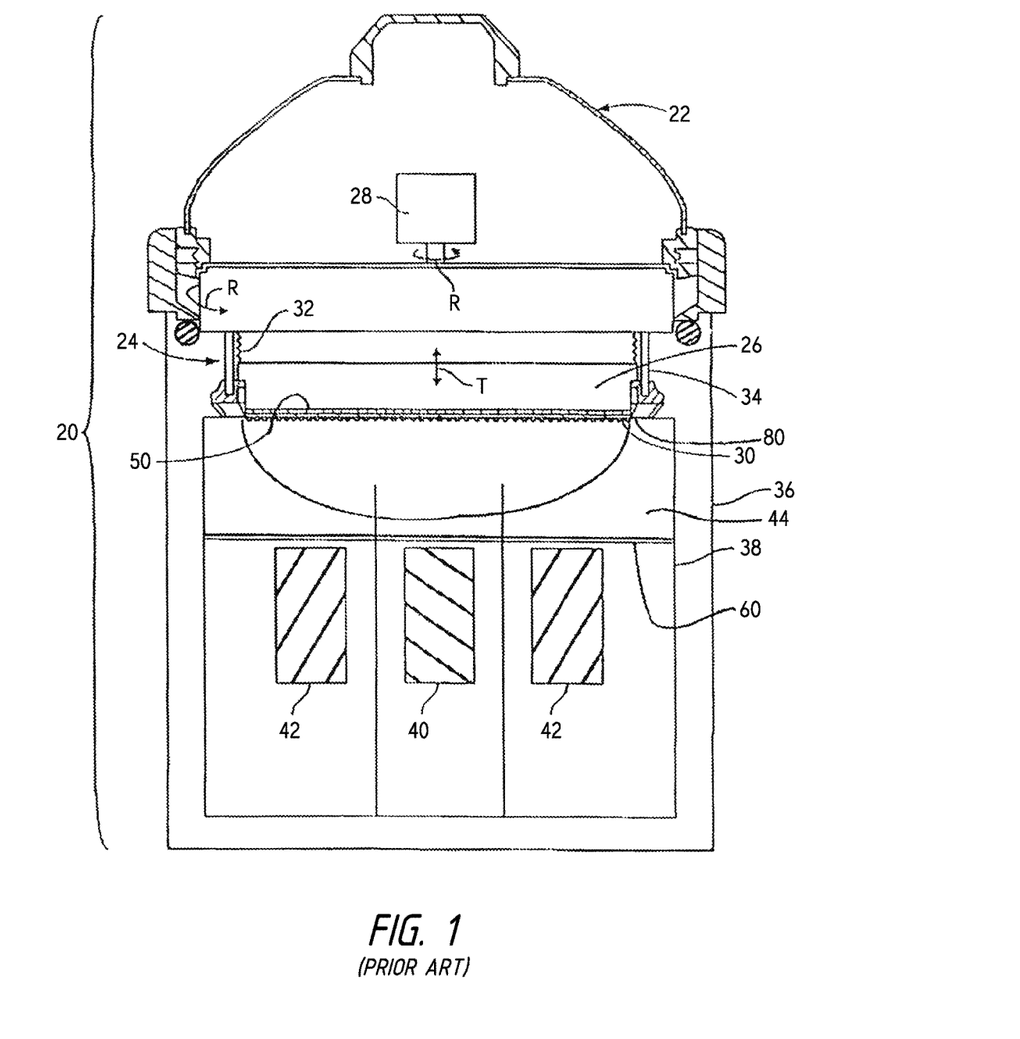
FIG. 1 is a section view diagram of an electrochemical processor.

As shown in FIG. 1, an electrochemical processor 20 has a rotor 24 in a head 22. The rotor 24 includes a backing plate 26 and a contact ring 30 having a seal 80. Contact ring actuators 34 move the contact ring 30 vertically (in the direction T in FIG. 1), to engage the contact ring 30 and the seal 80 onto the down facing surface of a wafer or substrate 50. A bellows 32 may be used to seal internal components of the head. The contact ring typically has metal fingers that contact a conductive layer on the wafer 50. The head 22 is positioned to place the substrate 50 into a bath of liquid electrolyte held in a vessel 38 in a base 36. One or more electrodes are in contact with the liquid electrolyte. FIG. 1 shows a design having a center electrode 40 surrounded by a single outer electrode 42, although multiple concentric outer electrodes may be used. An electric field shaping unit 44 made of a di-electric material may be positioned in the vessel between the electrodes and the wafer.

Figure 2:
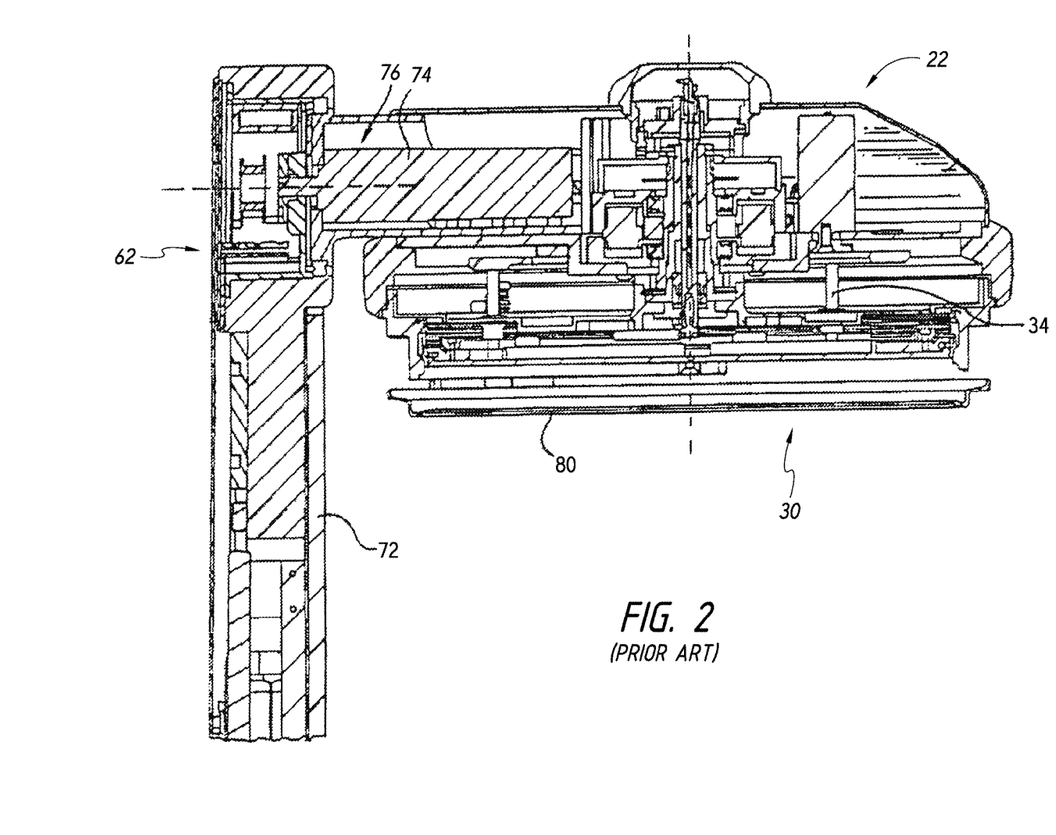
FIG. 2 is a section view diagram of the head shown in FIG. 1 supported on a lift/rotate mechanism.

A membrane 60 may optionally included, with anolyte in a lower chamber below the membrane and with catholyte in an upper chamber above the membrane 60. Electric current passes from the electrodes through the electrolyte to a conductive surface on the wafer, as is well known in the art. A motor 28 in the head may be used to rotate the wafer during electroplating. As shown in FIG. 2, the head 22 may be supported on the arm 74 of a lift/rotate mechanism 62 having a lifter 72 and a rotator 76. The lift/rotate mechanism 62 may be used to rotate or flip the head 22 into a head-up position, to load and unload wafers into the head 22. The rotater then rotates the head into a head-down position and the lifter lowers the head 22 into a processing position on the base. Alternatively, the head 22 may be supported on a lifter without any rotater. In this design, wafers are loaded and unloaded with the head 22 remaining in the head-down position shown in FIG. 2.

Figure 3:
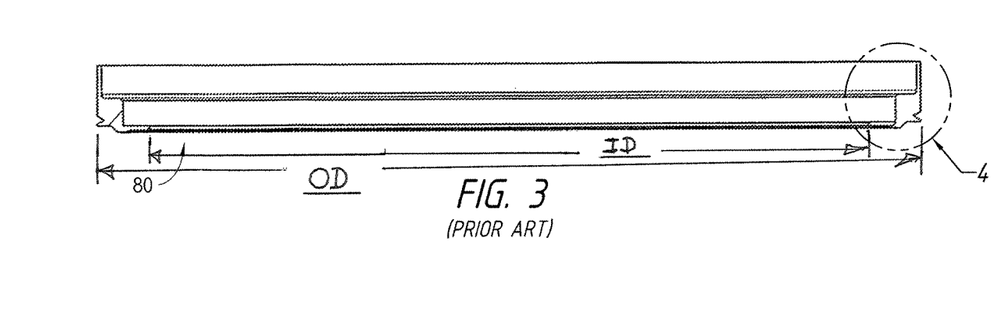
FIGS. 3-5 are views of a prior art seal assembly.
Figure 4:
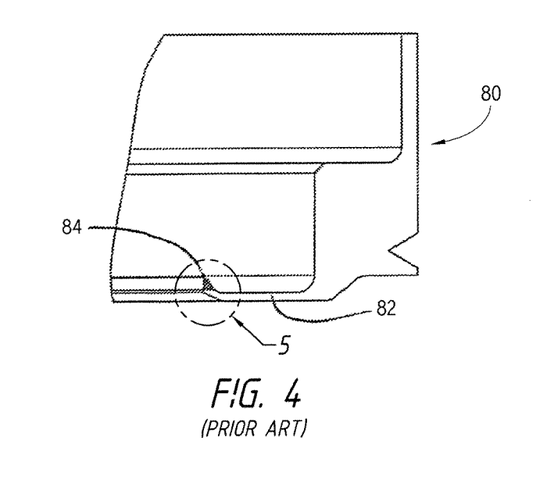
Figure 5:
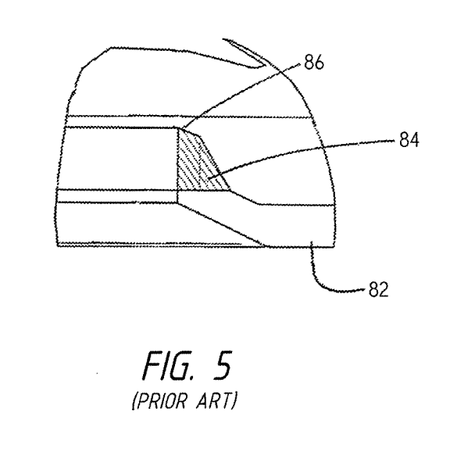

Various seal designs have been used in electrochemical processors. FIGS. 3-5 show one example. Seals that cover a wide surface area can better span over vias or similar features on the wafer. However, they tend to stick onto the wafer surface after the plating cycle, and also do not have as much compliance as narrower designs. Wide seals may therefore not seal as well over features with height changes.

A typical o-ring may naturally have no slip if it is clamped between two sealing surfaces. However, a clamped o-ring seal design in an electroplating processor would require a very tall structure which would interfere with electric field and mass-transfer at the edge of the wafer, and also tend to trap bubbles. As a result, in electroplating processors, seals are typically an elastomer at the tip/rim 84 of a beam-like or cantilever structure 82, and have an inner diameter ID and an outer diameter OD, such as shown in FIGS. 3 and 4. As this structure is loaded/deflected there is a radial tip movement that tends to slide the seal radially inward. Whether and how much the seal slides is a function of the friction between the seal and the wafer surface. A blanket layer of copper blanket on the wafer surface may have a much different friction to the seal compared to a photomask layer on a wafer.

Figure 10:
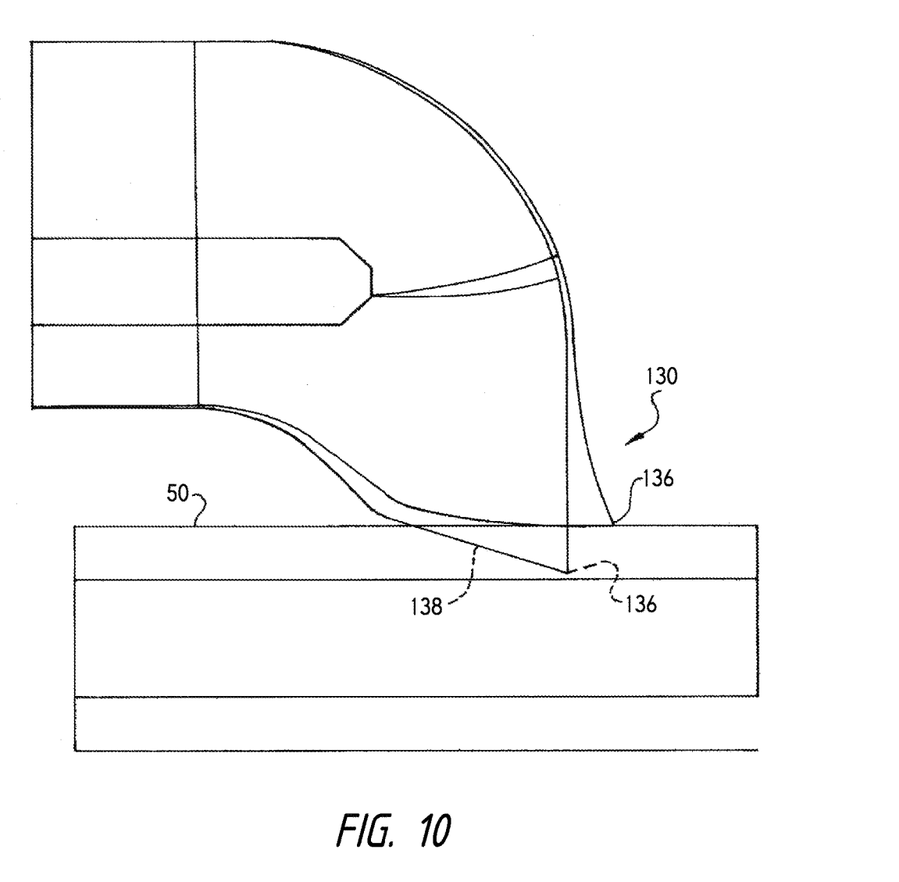
FIG. 10 is a section view diagram showing deformation of the seal assembly shown in FIGS. 8 and 9.

The inventors' analysis and mathematical modeling of seal behavior reveals that the seal tip can slip or deflect radially inward or outward when engaging the wafer as shown in FIG. 10. The seal may alternatively stick on some surfaces and not slide. If the seal slides on some portions of wafer and not on others, a leak may occur between the slipping and sticking areas. Also, the exposed plating area and plating uniformity can be adversely affected by sliding.

However, known seals or varying designs may or may not slip when used with different electrolytes and wafer surfaces. For example, a seal might not slip on copper seed wafers, yet slip on photoresist coated wafers, giving inconsistent results on various processes. Since nominal wafer engagement forces for a 12 inch wafer are about 30-50 lbs, there could be a significant variation in seal compliance and edge-exclusion if the seal slipped on some wafers and not on others. Perhaps, even more inconsistent results might result if the seal slips to varying degree on the same wafer (i.e. if the seal slips on only one side of the wafer).

The inventors have discovered that improved seal performance may be achieved by designing a seal that consistently and uniformly slides on various wafer surfaces. The inventors have also discovered that improved seal performance may be achieved by designing a seal that successfully resists sliding entirely, with the seal tip compressing or deforming without sliding during engagement onto the wafer.

Figure 6:
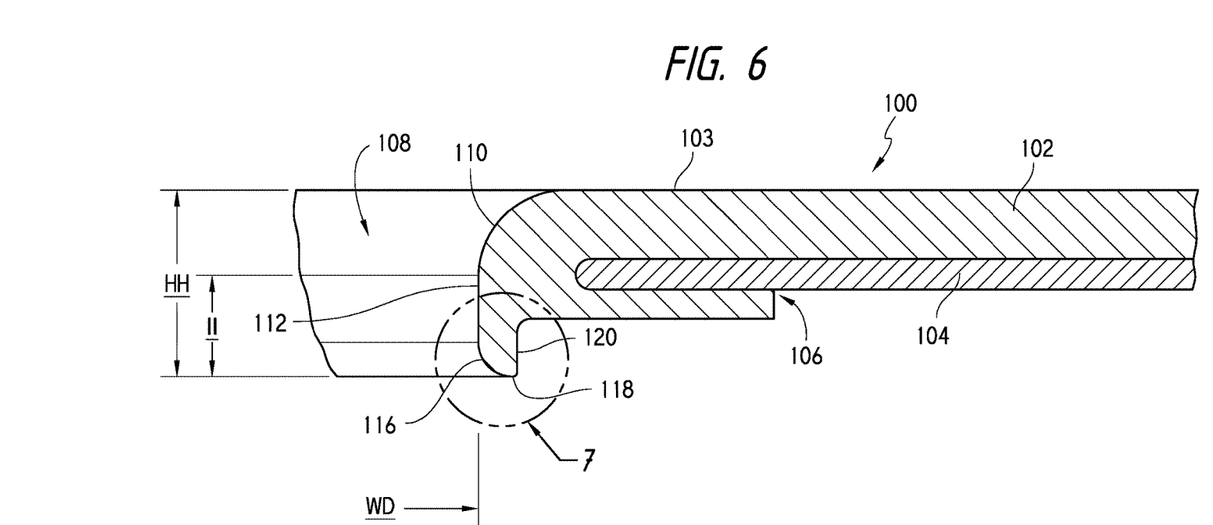
FIG. 6 is an enlarged section view of a first new seal assembly.
Figure 7:
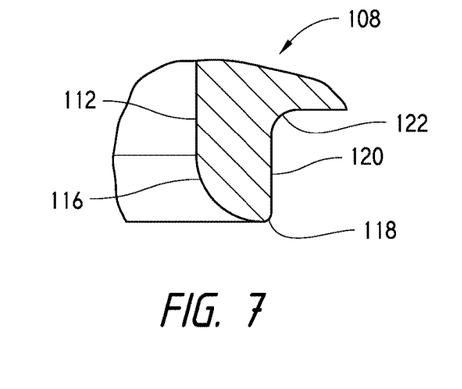
FIG. 7 is further enlarged detail view of the seal assembly shown in FIG. 6.

FIGS. 6 and 7 show a seal assembly 100 that resists sliding. In this no-slide design, a molded seal ring 102 of a seal material, such Viton® fluoroelastomer is attached onto a support ring 104 made e.g., metal. The support ring 104 may be stainless steel 0.01 to 0.03 inches thick. The inner edge of the support ring 104 may be inserted into or positioned within a slot 106 in the seal ring 102. In FIGS. 6-7, the seal assembly 100 is shown inverted of face down for purpose of illustration. When installed in an electrochemical processor 20, the seal assembly is face up, in the same orientation as the seal assembly 80 shown in FIGS. 3-5. Hence, while surface 103 in FIG. 6 is referred to as a top surface, in use it is at the bottom of the seal assembly 100. As an alternative to the design shown in FIG. 6, the seal may be over-molded onto the support ring, rather than using an insert or other mechanical element attachment.

Referring still to FIGS. 6 and 7, an arc section 110 at the inner diameter 108 of the seal ring 102 transitions from the flat top surface 103 to a straighter section 112 of the seal ring 102. The straighter section 112, which may be substantially vertical, transitions or joins into a tip arc 116. An end radius 118 extends between the tip arc 116 and an outer wall 120, which may be straight, and also parallel to the straighter section 112.

The end radius 118 may range from 0.001 to 0.005 or 0.001 to 0.003 inches. The tip arc 116 may have a radius ranging from 0.010 to 0.30 or 0.015 to 0.025 inches. Dimension HH, in FIG. 6 (height of the seal ring 102) may range from 0.05 to 0.20 or 0.08 to 0.15 inches. Dimension II may range from 0.03 to 0.07 or 0.04 to 0.06 inches. Dimension WD, the inside diameter of the straighter section 112 may typically be 11.600 to 11.640 for use with a 12 inch wafer. WD will of course vary with the diameter of the wafer to be processed. For an 18 inch (450 mm) diameter wafer, WD may be 17.60 to 17.64 inches. The inner radius 122 which joins the outer wall 120 to the bottom surface 124 of the seal ring 102 may have a radius of 0.006 to 0.010.

The seal ring 102 shown in FIGS. 6 and 7 is a no-slip design, as it has little or no slip when pressed into contact with a wafer. The end 118 of the seal ring 102 contacts a narrow annular surface on the wafer, generally 0.005 to 0.015 or 0.025 inches wide. The end 118 does not slip or deflect inward or outward. The contact ring 30 is pulled up by the actuators 34 to move the electrical contacts on the contact ring, and the seal ring 102 into contact with the wafer.

The dimensions of different sections of the seal may be selected to achieve a low or zero-slip design. In use, one section or area of the seal structure (i.e. the ring 104 and the elastomer beyond the structure around the arc section 110) deflects slightly up and moves the tip radially inward, while another section (i.e. the tip arc 116 and the wall 120) deflect radially outward. The seal may be designed so that the radially inward motion on one part of the seal structure is matched by the radially outward motion of another part of the structure. The result is then that the net sliding motion at the end 118 is minimal, e.g., less than 0.5 mm, 0.25 mm, 0.2 mm, 0.1 mm, 0.05 mm, or even zero.

The contact force applied to the seal ring 102 may vary from about 40 to 120 pounds, for an 11.62 ID seal ring. The contact force causes the end 118 and the tip arc 116 to deform, with little or no sliding. This no-slip design, coupled with using a relatively rigid metal support ring 104, gives a more precise sealing dimension, which improves yield as the patterns are moved closer to the edge of the wafer. The no-slip seal ring 102 has compliance and a small amount of deflection at given force without the seal end 118 tending to move in the lateral direction as the seal engages the wafer. This avoids the possibility of the end 118 rolling under itself and affecting the seal performance.

Figure 8:
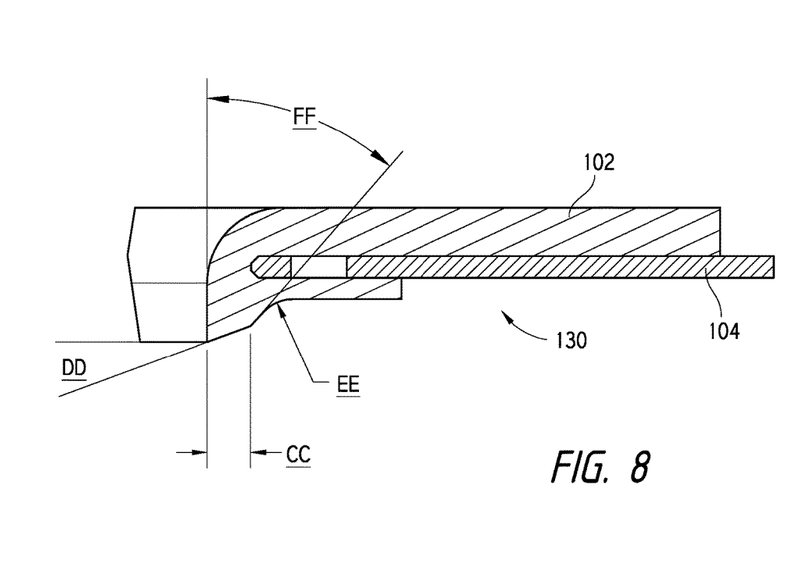
FIGS. 8 and 9 are enlarged section views of a second new seal assembly.
Figure 9:
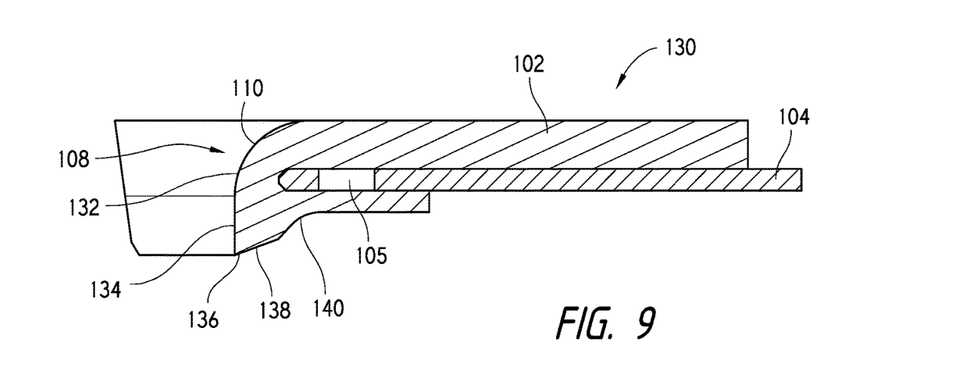

FIGS. 8 and 9 show an alternative seal assembly having a seal ring 130 with a knife edge design. As shown in FIG. 9, the seal ring 130 has an arc section 110 and a straight section 134 which forms a knife edge 136 with an outer angle surface 138. An outer radius 140 runs from a horizontal surface of the seal ring 130 to the outer angle surface 138. A ring hole 105 may be provided in the ring plate 104. The seal ring 130 may otherwise be similar to the seal ring 100.

In use, the knife edge of the seal ring 130 engages the wafer at the inner-radius. The seal ring 130 will deflect more for a specified applied contact force. However, the deflection of slip is uniform. Referring to FIG. 8, CC may be 0.01 to 0.06 or 0.02 to 0.04 inches. Angle DD may be 10 to 30 or 15 to 25 degrees. Angle FF may be 25 to 55, 30 to 40, or 35 to 45 degrees. Radius EE may be 0.02 to 0.03 inches.

Figure 11:
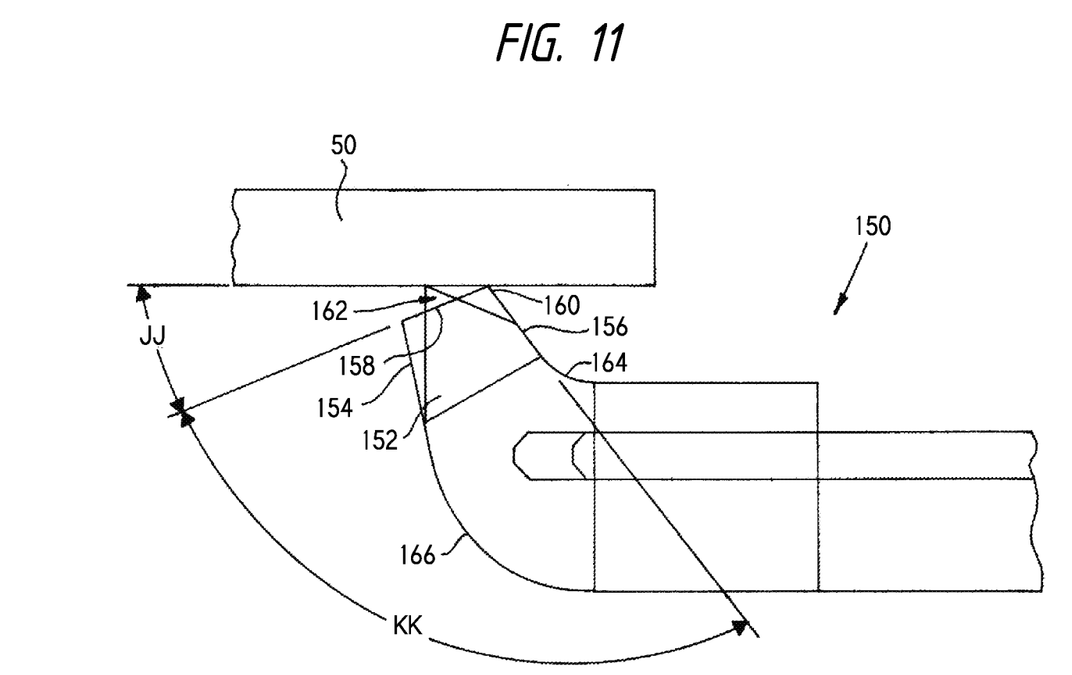
FIG. 11 is a section view diagram of a third new seal assembly shown in contact with a substrate.

FIG. 11 shows a reverse knife edge seal 150, shown in the face up position. The reverse knife edge seal 150 may have an end or trapezoid section 152 having inner and outer walls 154 and 156, and a top surface 158 forming an obtuse angle KK with the inner wall 156. The angle KK may range from 90 to 130 or 100 to 120 degrees. The walls 154 and 156, and the top surface 158 may be straight. The inner wall 154 and the top surface 158 form a knife edge 160. A shielded area 162 is formed between the top surface 158 and the wafer surface. The end section 152 transitions to the horizontal top and bottom surfaces of the seal ring 150 via inner and outer radii 164 and 166. As shown in FIG. 11, with the seal ring 150 engaged onto a wafer 50, the surface 158 forms an acute angle JJ with the wafer surface, with JJ ranging from 10 to 45 degrees.

The seal ring 150 has relatively high local compliance like the knife-edge seal ring 130. The seal ring 150 can also help shield the plating rate directly at the seal-wafer interface. This may help reduce seal failure due to plate-up of the seal material for some chemistries. Both seal rings 130 and 150 seal with less surface area than conventional designs. The seal ring 130 seals at the very I.D. of the seal. The seal ring 150 pulls the seal lip inboard to the seal (closer to the edge of the wafer). The lower surface which creates the point of the seal lip is now at the front of the seal. This creates an over hang that shields the seal lip from the high current densities. The overhang 162 may reduce the local plating rate at the seal/wafer contact and may reduce the tendency for seal plate up.

The dimensions and angles discussed above are provided as examples and are not critical to the performance of the seal rings. Dimensions outside of the given ranges may be used in alternative designs. The term wafer here means any substrate on which micro-scale devices may be formed. Micro-scale devices include microelectronic, micromechanical, microelectro-mechanical, micro-optical and micro-fluidic devices, whether formed on semiconductor or other substrate materials.

Thus, novel designs and methods have been shown and described. Various changes and substitutions may of course be made without departing from the spirit and scope of the invention. The invention, therefore, should not be limited except to the following claims and their equivalents.

The invention claimed is:

1. A seal for use in an electrochemical processor, comprising:
   a seal ring having an inner diameter and an outer diameter, and a flat horizontal top surface;
   an arc section at the inner diameter of the seal ring extending from the flat horizontal top surface of the seal ring to a straight vertical section of the seal ring;
   the straight vertical section adjoining a tip arc having a first radius of curvature;
   an outer wall adjoining a bottom surface of the seal ring, and an end radius having a second radius of curvature, the end radius between the outer wall and the tip arc, with the outer wall parallel to the straight vertical section, and with the first radius of curvature 2 to 30 times greater than the second radius of curvature;
   a support ring supporting the seal ring, the support ring having a flat inner edge inserted into an outward facing horizontal slot in the seal ring adjacent to the inner diameter of the seal ring, with the horizontal slot parallel to the top surface of the seal ring.

2. The seal of claim 1 wherein the outer wall is straight and vertical and an inner wall of the seal ring between the arc section and the tip arc is flat, parallel and co-axial with the outer wall.

3. The seal of claim 1 having a height of 1 to 5 mm.

4. The seal of claim 1 wherein the inside diameter is 294.6 to 295.7 mm.

5. The seal of claim 1 with the tip arc having a concave curvature.

6. The seal of claim 1 with the end radius having a radius of curvature of less than 0.13 mm.

7. The seal of claim 1 wherein the straight vertical section is flat and concentric with the outer wall.

8. The seal of claim 1 wherein the support ring comprises metal and the seal ring comprises a fluoroelastomer.

9. A seal for sealing against a semiconductor material wafer during electroplating in an electrochemical processor, comprising:
   a seal ring having an inner diameter, an outer diameter, and a top surface, wherein the entire top surface of the seal ring is horizontal and flat;
   an arc section at the inner diameter of the seal ring extending from the flat horizontal top surface of the seal ring to a straight vertical section of the seal ring;
   the straight vertical section adjoining a tip arc having a first radius of curvature;
   an outer wall adjoining a bottom surface of the seal ring, and an end radius having a second radius of curvature, the end radius between the outer wall and the tip arc, with the outer wall parallel to the straight vertical section, and with the first radius of curvature greater than the second radius of curvature; and
   a support ring supporting the seal ring, the support ring having a flat inner edge inserted into an outward facing horizontal slot in the seal ring parallel to the top surface of the seal ring.

10. The seal of claim 9 wherein the support ring is entirely flat.

11. The seal of claim 1 wherein the support ring is entirely flat.

* * * * *